(12) United States Patent
Adl-Tabatabai et al.

(10) Patent No.: US 8,356,166 B2
(45) Date of Patent: Jan. 15, 2013

(54) MINIMIZING CODE DUPLICATION IN AN UNBOUNDED TRANSACTIONAL MEMORY SYSTEM BY USING MODE AGNOSTIC TRANSACTIONAL READ AND WRITE BARRIERS

(75) Inventors: Ali-Reza Adl-Tabatabai, San Jose, CA (US); Bratin Saha, Santa Clara, CA (US); Gad Sheaffer, Haifa (IL); Vadim Bassin, Raanana (IL); Robert Y. Geva, Cupertino, CA (US); Martin Taillefer, Redmond, WA (US); Darek Mihocka, Bellevue, WA (US); Burton Jordan Smith, Seattle, WA (US); Jan Gray, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 667 days.

(21) Appl. No.: 12/493,168

(22) Filed: Jun. 26, 2009

(65) Prior Publication Data

US 2010/0332808 A1    Dec. 30, 2010

(51) Int. Cl.
*G06F 15/00* (2006.01)
*G06F 9/00* (2006.01)
*G06F 9/44* (2006.01)
*G06F 7/38* (2006.01)

(52) U.S. Cl. .................. 712/229; 712/220; 712/28

(58) Field of Classification Search ................. None
See application file for complete search history.

(56) References Cited

U.S. PATENT DOCUMENTS

| | | |
|---|---|---|
| 4,442,487 A | 4/1984 | Fletcher |
| 5,394,555 A | 2/1995 | Hunter |
| 5,404,555 A | 4/1995 | Liu |
| 5,428,761 A | 6/1995 | Herlihy et al. |
| 5,768,500 A | 6/1998 | Agrawal |
| 5,835,764 A | 11/1998 | Platt |
| 6,314,563 B1 | 11/2001 | Agensen |
| 6,665,704 B1 | 12/2003 | Singh |
| 6,751,617 B1 | 6/2004 | Anfindsen |
| 6,842,830 B2 | 1/2005 | Khare |
| 6,845,430 B2 | 1/2005 | Hopeman |
| 6,862,635 B1 | 3/2005 | Alverson |
| 6,871,264 B2 | 3/2005 | Soltis |
| 6,898,609 B2 | 5/2005 | Kerwin |
| 6,938,128 B1 | 8/2005 | Kuskin et al. |
| 6,976,155 B2 | 12/2005 | Drysdale |
| 7,111,294 B2 | 9/2006 | Steensgaard |
| 7,127,561 B2 | 10/2006 | Hill |

(Continued)

OTHER PUBLICATIONS

Minh et al. (An Effective Hybrid Transactional Memory System with Strong Isolation Guarantees, May 2007, pp. 69-80).*

(Continued)

*Primary Examiner* — Eddie P Chan
*Assistant Examiner* — George Giroux
(74) *Attorney, Agent, or Firm* — Workman Nydegger

(57) ABSTRACT

Minimizing code duplication in an unbounded transactional memory system. A computing apparatus including one or more processors in which it is possible to use a set of common mode-agnostic TM barrier sequences that runs on legacy ISA and extended ISA processors, and that employs hardware filter indicators (when available) to filter redundant applications of TM barriers, and that enables a compiled binary representation of the subject code to run correctly in any of the currently implemented set of transactional memory execution modes, including running the code outside of a transaction, and that enables the same compiled binary to continue to work with future TM implementations which may introduce as yet unknown future TM execution modes.

15 Claims, 2 Drawing Sheets

U.S. PATENT DOCUMENTS

| | | |
|---|---|---|
| 7,162,512 B1 | 1/2007 | Amit |
| 7,181,578 B1 | 2/2007 | Guha |
| 7,210,145 B2 | 4/2007 | Srinivasan |
| 7,213,106 B1 | 5/2007 | Koster |
| 7,246,123 B2 | 7/2007 | Carr |
| 7,320,065 B2 | 1/2008 | Gosior |
| 7,376,800 B1 | 5/2008 | Choquette |
| 7,395,382 B1 | 7/2008 | Moir |
| 7,406,698 B2 | 7/2008 | Richardson |
| 7,467,323 B2 | 12/2008 | Fields |
| 7,478,210 B2 | 1/2009 | Saha |
| 7,502,897 B2 | 3/2009 | Hertzberg |
| 7,512,636 B2 | 3/2009 | Verma |
| 7,516,366 B2 | 4/2009 | Lev |
| 7,584,232 B2 | 9/2009 | Guo |
| 7,711,909 B1 | 5/2010 | Lev et al. |
| 8,095,824 B2 | 1/2012 | Gray |
| 2003/0188300 A1 | 10/2003 | Patrudu |
| 2004/0243868 A1 | 12/2004 | Toll et al. |
| 2005/0060495 A1 | 3/2005 | Pistoulet |
| 2005/0246487 A1 | 11/2005 | Ergan |
| 2006/0085591 A1 | 4/2006 | Kumar |
| 2007/0143287 A1 | 6/2007 | Adi-Tabatabai |
| 2007/0143741 A1 | 6/2007 | Harris |
| 2007/0156780 A1 | 7/2007 | Saha |
| 2007/0156994 A1 | 7/2007 | Akkary |
| 2007/0198792 A1 | 8/2007 | Dice |
| 2007/0198979 A1 | 8/2007 | Dice |
| 2007/0239943 A1 | 10/2007 | Dice |
| 2007/0245099 A1* | 10/2007 | Gray et al. ............... 711/156 |
| 2007/0245128 A1 | 10/2007 | Gray |
| 2007/0260608 A1 | 11/2007 | Hertzberg |
| 2007/0260942 A1 | 11/2007 | Rajwar |
| 2008/0021934 A1 | 1/2008 | Hudson |
| 2008/0040551 A1 | 2/2008 | Gray |
| 2008/0127035 A1 | 5/2008 | Lev |
| 2008/0162886 A1* | 7/2008 | Saha et al. ............... 712/214 |
| 2008/0163220 A1 | 7/2008 | Wang |
| 2008/0270745 A1 | 10/2008 | Saha |
| 2009/0006407 A1 | 1/2009 | Magruder |
| 2009/0006467 A1 | 1/2009 | Visscher |
| 2009/0006751 A1 | 1/2009 | Taillefer |
| 2009/0006767 A1 | 1/2009 | Saha |
| 2009/0007119 A1 | 1/2009 | Blumrich |
| 2009/0019231 A1 | 1/2009 | Cypher |
| 2009/0063780 A1 | 3/2009 | Terechko |
| 2009/0089520 A1 | 4/2009 | Saha |
| 2009/0113443 A1 | 4/2009 | Heller |
| 2009/0165006 A1 | 6/2009 | Ceze |
| 2009/0172292 A1 | 7/2009 | Saha |
| 2009/0172303 A1 | 7/2009 | Welc |
| 2009/0172305 A1 | 7/2009 | Shpeisman |
| 2009/0172306 A1 | 7/2009 | Nussbaum |
| 2009/0172654 A1 | 7/2009 | Zhao |
| 2009/0204969 A1 | 8/2009 | Abadi |
| 2009/0235237 A1 | 9/2009 | Song et al. |
| 2009/0235262 A1 | 9/2009 | Ceze et al. |
| 2009/0260011 A1 | 10/2009 | Snover |
| 2010/0131953 A1 | 5/2010 | Dice |
| 2010/0162249 A1 | 6/2010 | Shpeisman |
| 2010/0169382 A1 | 7/2010 | Sheaffer |
| 2010/0169579 A1 | 7/2010 | Sheaffer |
| 2010/0169580 A1 | 7/2010 | Sheaffer |
| 2010/0229043 A1 | 9/2010 | Saha |
| 2010/0325630 A1 | 12/2010 | Flood |
| 2011/0145304 A1 | 6/2011 | Gray |
| 2011/0145498 A1 | 6/2011 | Taillefer |
| 2011/0145553 A1 | 6/2011 | Levanoni |
| 2011/0145802 A1 | 6/2011 | Levanoni |

OTHER PUBLICATIONS

Office Action dated Oct. 4, 2011 cited in U.S. Appl. No. 12/495,582.
Notice of Allowance dated Nov. 28, 2011 cited in U.S. Appl. No. 12/493,163.
Office Action dated Dec. 12, 2011 cited in U.S. Appl. No. 12/493,165.
Moravan; "Supporting Nested Transactional Memory in LogTM"; Oct. 21-25, 2006; pp. 1-12; http://www.cs.wisc.edu/multifacet/papers/asplos06_nested_logtm.pdf.
Author Unknown; "Extending Hardware Transactional Memory to Support Non-Busy Waiting and Non-Transactional Actions"; 2006; pp. 1-19; http://209.85.229.132/search?q=cache:-9KSLEk_CcIJ:www.cs.purdue.edu/homes/jv/events/TRANSACT/slides/zilles.pdf+non-transactional+instructions+and+abort&cd=3&hl=en&ct=clnk&gl=in.
Carlstrom; "The ATOMOE Transactional Programming Language"; Jun. 11-16, 2006; pp. 1-13; http://tcc.stanford.edu/publications/tcc_pldi2006.pdf.
Chong; "Scalable HMM based Inference Engine in LVCSR"; Mar. 31, 2009; 1 page; http://www.icsi.berkeley.edu/cgi-bin/events/event.pl?ID=000531.
Zeichick; "Massive Multi-Core Processors: The Gainer's Edge"; Oct. 4, 2007; pp. 1-2; http://developer.amd.com/documentation/articles/Pages/1042007177.aspx.
Vasantharam; "CSMP"; 2009; pp. 1-3; http://sourceforge.net/projects/mupisoft/.
Bracy; "Disintermediated Active Communication"—Nov. 9, 2006—pp. 1-4—http://ieeexplore.ieee.org/stamp/stamp.jsp?arnumber=04069172.
Shriraman; "Hardware Acceleration of Software Transactional Memory"—Dec. 2005—pp. 1-22—https://urresearch.rochester.edu/retrieve/5518/05.tr887.Hardware_acceleration_of_software_transactional_memory.pdf.
Sondag; "Predictive Thread-to-Core Assignment on a Heterogeneous Multi-Core Processor"—Oct. 18, 2007—pp. 1-5—http://citeseerx.ist.psu.edu/viewdoc/download?doi=10.1.1.90.9734&rep=rep1&type=pdf.
Zhao; "CacheScouts: Fine-Grain Monitoring of Shared Caches in CMP Platforms"—2007—pp. 1-11—http://www.cs.ucr.edu/~zhao/paper/Pact_CacheScout_2007.pdf.
Lilja; "Cache Coherence in Large-Scale Shared Memory Multiprocessors: Issues and Comparisons"—Sep. 1993—pp. 1-43—http://www.arctic.umn.edu/papers/coherence-survey.pdf.
Censier; "A New Solution to Coherence Problems in Multicache Systems"—Dec. 1978—pp. 1-7—http://citeseerx.ist.psu.edu/viewdoc/download?doi=10.1.1.111.7854&rep=rep1&type=pdf.
Papamarcos; "A Low-Overhead Coherence Solution for Multiprocessors with Private Cache Memories"—1984—pp. 348-354—http://www.csl.cornell.edu/courses/ece572/papamarcos.isca84.pdf.
Chuang; "Unbounded Page-Based Transactional Memory"—Oct. 21-25, 2006—pp. 1-12—http://www.cse.ucsd.edu/~wchuang/ASPLOS-06-PTM.pdf.
Swift; "OS Support for Virtualizing Hardware Transactional Memory"—2008—pp. 1-10—http://www.cs.wisc.edu/multifacet/papers/transact08_tvm.pdf.
Singh; "A Metadata Catalog Service for Data Intensive Applications"—Nov. 15-21, 2003—pp. 1-17—http://www.irit.fr/~Jean-Marc.Pierson/DEAGrids/2003-2004/DataandMetaDataManagement/mcs_sc2003.pdf.
Andrew; "A Dictionary of HTML META Tags"—Feb. 11, 2007—pp. 1-11—http://vancouver-webpages.com/META/metatags.detail.html.
Spear; "Implementing and Exploiting Inevitability in Software Transactional Memory"—2008—pp. 59-66—http://ieeexplore.ieee.org/stamp/stamp.jsp?arnumber=04625833.
Author Unknown; Wikipedia; "Software Transactional Memory"—May 7, 2009—pp. 1-7—http://en.wikipedia.org/wiki/Software_transactional_memory.
Ananian; "Unbounded Transactional Memory"; 2009; pp. 1-12; http://supertech.csail.mit.edu/papers/xaction.ps.
Shriraman; "Hardware Acceleration of Software Transactional Memory"; Dec. 2005; pp. 1-22; https://urresearch.rochester.edu/retrieve/5518/05.tr887.Hardware_acceleration_of_software_transactional_memory.pdf.
Yen; "LogTM-SE: Decoupling Hardware Transactional Memory from Caches"; Feb. 10-14, 2007; pp. 1-12; http://www.cs.wisc.edu/multifacet/papers/hpca07_logtmse.pdf.

Author Unknown; "CP3SP33 Connectivity Processor with Cache, DSP, and Bluetooth, USB, and Dual CAN Interfaces"; Jul. 2007; pp. 1-346; http://www.national.com/appinfo/cp3000/files/CP3SP33.pdf.

Abadi; "Transactional Memory with Strong Atomicity Using Off-the-Shelf Memory Protection Hardware"; 2009; pp. 1-11; http://research.microsoft.com/en-us/um/people/tharris/papers/2009-ppopp.pdf.

Zilles et al. "Extending Hardware Transactional Memory to Support Non-busy Waiting and Non-transactional Actions," Nov. 2006, pp. 1-10.

Joao; "Flexible Reference-Counting-Based Hardware Acceleration for Garbage Collection"—Published Jun. 20-24, 2009 pp. 1-11.

Grossman; "The Transactional Memory/Garbage Collection Analogy"—Published Oct. 21-25, 2007—pp. 1-12.

Adl-Tabatabai; "Unlocking Concurrency"—Published Dec./Jan. 2006-2007 pp. 25-33.

Carlstrom; "Executing Java Programs with Transactional Memory"—Published Mar. 26, 2007 pp. 1-32.

Diestelhorst—"Hardware Acceleration for lock-free data structures and software-transactional memory"—Published Aug. 14, 2008 pp. 1-8.

Harizopoulos—"Steps towards cache-resident transaction processing"—Published 2004 pp. 1-12.

Lie—"Hardware Support for Unbounded Transactional Memory"—Published May 7, 2004 pp. 1-111.

Saha—"Architectural Support for Software Transactional Memory"—Published 2006 pp. 1-12.

Volos—"NePaITM: Design and Implementation of Nested Parallelism for Transactional Memory"—Published 2009, pp. 1-25.

Rothermel—"Concurrency Control Issues in Nested Transactions"—Published 1992, pp. 1-36.

Author Unknown—".NET Framework 4 Beta 1 enabled to use Software Transactional Memory (STM.NET Version 1.0)"—Published Jul. 24, 2009; pp. 1-84.

Nyte—"Nesting Models in Software Transactional Memory"—Published Sep. 14, 2007; pp. 1-3.

Agrawal—"Nested parallelism in transactional memory"—Published 2008; pp. 163-174.

Bobba—"Performance Pathologies in Hardware Transactional Memory"—Published 2007; pp. 1-11.

Author Unknown—"Hw-breakpoint: shared debugging registers"—Published Sep. 16, 2009; pp. 1-3.

Scherer—"Contention Management in Dynamic Software Transactional Memory"—Published Apr. 2004; pp. 1-10.

Curnow—"An Embedded Processor Architecture with Extensive Support for SoC Debug"—Retrieved Jun. 11, 2010; pp. 1-5.

Office Action dated Jan. 20, 2012 cited in U.S. Appl. No. 12/493,167.

Office Action dated Feb. 3, 2012 cited in U.S. Appl. No. 12/493,164.

Notice of Allowance dated Feb. 21, 2012 cited in U.S. Appl. No. 12/493,161.

Office Action dated Aug. 20, 2012 cited in U.S. Appl. No. 12/638,929.

Office Action dated Aug. 16, 2012 cited in U.S. Appl. No. 12/493,164.

Office Action dated Apr. 4, 2012 cited in U.S. Appl. No. 12/638,929.

Chaung; "Maintaining Safe Memory for Security, Debugging, and Multi-threading"; 2006; pp. 1-186; http://www.cse.ucsd.edu/Dienst/Repository/2.0/Body/ncstrl.ucsd_cse/CS2006-0873/postscript.

Moss; "Open Nested Transactions"; Semantics and Support; 2006; pp. 1-8; http://www.cs.utah.edu/wmpi/2006/final-version/wmpi-posters-1-Moss.pdf.

Notice of Allowance dated Mar. 14, 2012 cited in U.S. Appl. No. 12/495,582.

Office Action dated Mar. 16, 2012 cited in U.S. Appl. No. 12/493,162.

Notice of Allowance dated Apr. 9, 2012 cited in U.S. Appl. No. 12/493,161.

Office Action dated Oct. 24, 2012 cited in U.S. Appl. No. 12/493,162 (Copy Attached).

Notice of Allowance dated Sep. 24, 2012 cited in U.S. Appl. No. 12/493,165 (Copy Attached).

Office Action dated Oct. 5, 2012 cited in U.S. Appl. No. 12/493,167 (Copy Attached).

* cited by examiner

MINIMIZING CODE DUPLICATION IN AN UNBOUNDED TRANSACTIONAL MEMORY SYSTEM BY USING MODE AGNOSTIC TRANSACTIONAL READ AND WRITE BARRIERS

CROSS-REFERENCE TO RELATED APPLICATIONS

This application is related to U.S. patent application Ser. No. 12/493,165, filed Jun. 26, 2009, and entitled "META-PHYSICALLY ADDRESSED CACHE METADTA", as well as U.S. application Ser. No. 12/493,163, filed Jun. 26, 2009, and entitled "WAIT LOSS SYNCHRONIZATION", as well as U.S. application Ser. No. 12/493,162, filed Jun. 26, 2009, and entitled "FLEXIBLE READ-AND WRITE-MONITORED AND BUFFERED MEMORY BLOCKS", as well as U.S. application Ser. No. 12/493,164, filed Jun. 26, 2009, and entitled "PRIVATE MEMORY REGIONS AND COHERENCE OPTIMIZATIONS", as well as U.S. application Ser. No. 12/493,161, filed Jun. 26, 2009, and entitled "OPERATING SYSTEM VIRTUAL MEMORY MANAGEMENT FOR HARDWARE TRANSACTIONAL MEMORY", as well as U.S. application Ser. No. 12/493,167, filed Jun. 26, 2009, and entitled "PERFORMING ESCAPE ACTIONS IN TRANSACTIONS". All of the foregoing applications are being filed concurrently herewith and are incorporated herein by reference.

BACKGROUND

Background and Relevant Art

Computers and computing systems have affected nearly every aspect of modern living. Computers are generally involved in work, recreation, healthcare, transportation, entertainment, household management, etc.

Recent advances in computing implement multi-thread computing where multiple agents (e.g. processors and/or multiple cores and/or multiple threads) each perform work and each may access shared resources at the same time. It is a challenge to program such multithreaded shared memory computer systems because the threads may access common data in shared memory without synchronization leading to race conditions or synchronized by locks which can sometimes lead to thread deadlock. Also multithreaded software is hard to test and debug.

To better manage concurrent operation over shared memory, computing systems implement transactional operations where for a given set of operations, either all of the operations are performed or none of the operations are performed. For example, a banking system may have operations for crediting and debiting accounts. When operations are performed to exchange money from one account to another, serious problems can occur if the system is allowed to credit one account without debiting another account. However, transactional computing maintains historical information such that operations can be rolled back if all operations in an atomic set of operations cannot be performed.

Transactional computing can be implemented, in some systems using specialized hardware that supports transactional memory. In systems where hardware does not support hardware based transaction computing, transactional computing can be performed by using software techniques.

Transactional memory systems may have a code expansion problem. In particular, several different versions of code may need to be generated depending on execution modes used by hardware and for software implementations. Hardware accelerated systems can use multiple execution modes that use hardware acceleration in different ways To in-line transactional memory related instructions, the transactional memory system requires generates a different version of code for each transactional execution mode. In addition, the transactional memory system generates yet another version of the code to support pure software transactional memory implementations for machines that do not have transactional memory hardware.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment includes a method of executing transactional memory atomic blocks in any of one or more of a plurality of transactional execution modes, including processor transactional execution modes or in modes not supporting hardware based transactional execution, or even when not in a transaction. Transacted data accesses, including loads or stores, are translated into, and executed using mode agnostic transactional read barriers for loads and mode agnostic transactional write barriers for stores. The method includes utilizing a mode agnostic transactional read barrier. The mode agnostic transactional read barrier includes one or more code sequences including optionally dispatching to a plurality of mode specific transactional read barrier code sequences for different transactional execution modes. The mode agnostic transactional read barrier includes common code sequences irrespective of the current transactional execution mode. Utilizing the mode agnostic transaction read barrier includes executing one or more instructions to load data and executing one or more code sequences to implement one or more mode specific transactional read barriers, appropriate for a transactional execution mode, on the data.

The method further includes utilizing a mode agnostic transactional write barrier. The mode agnostic transactional write barrier includes optionally dispatching to a plurality of mode specific transactional write barrier code sequences for different transactional execution modes. The mode agnostic transactional write barrier includes the same common code sequences irrespective of the current transactional execution mode. Utilizing the mode agnostic transaction write barrier includes executing one or more instructions to store data, and executing one or more code sequences to implement one or more mode specific transactional write barriers, appropriate for a transactional execution mode, on the data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1A:
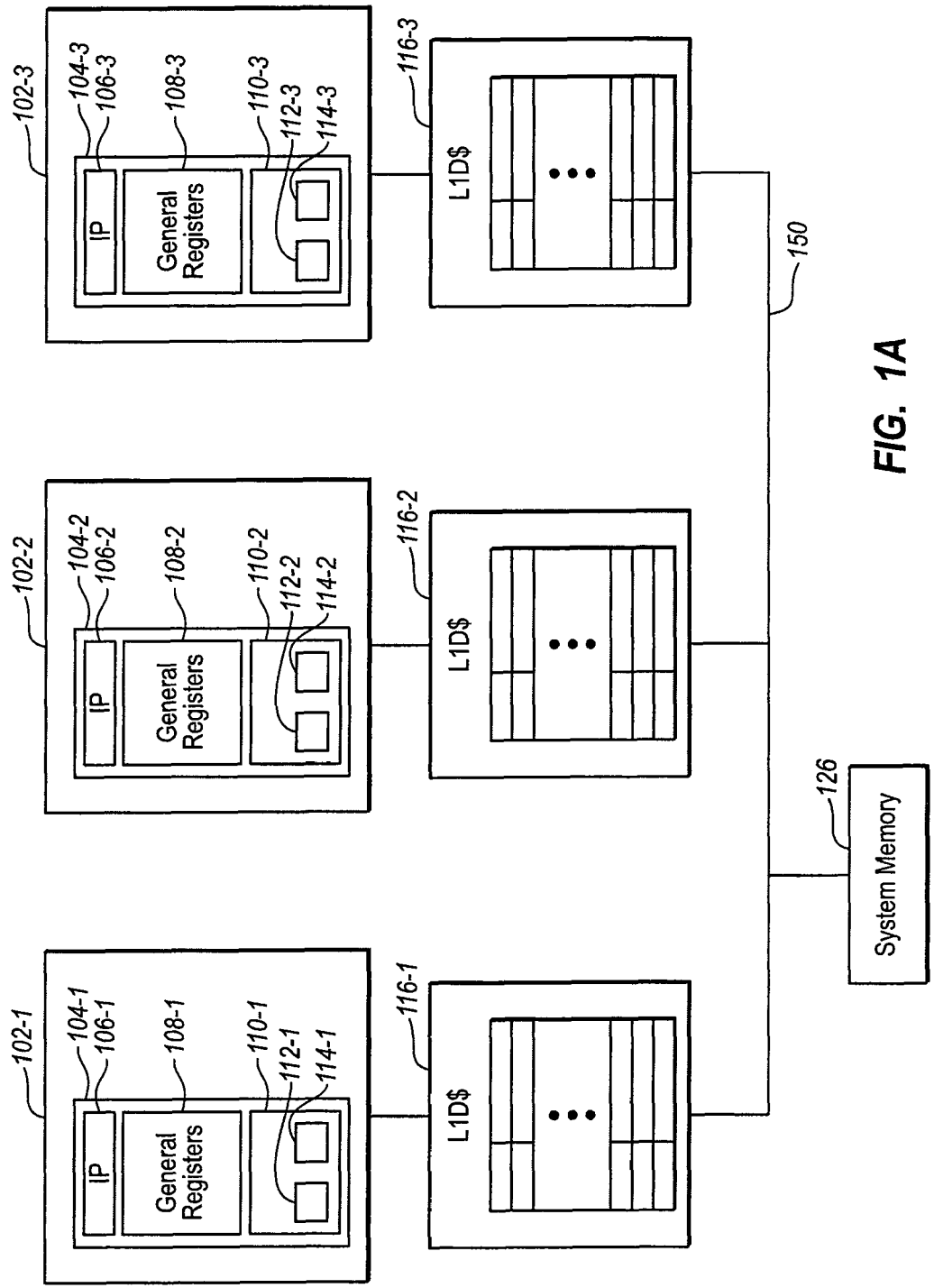
FIG. 1A illustrates a cache hierarchy.

The following presentation is organized into a broad description of the invention and surrounding context, followed by detailed examples of some embodiments that may be implemented.

Fast Flexible Unbounded Transactional Memory

Most modern computer systems comprise multiple processors, caches, and a memory system hierarchy that provides a shared memory to multiple threads run on the processors. Threads may concurrently access shared data structures in the shared memory.

It can be difficult to program such machines. Shared data may be accessed at any moment by other threads. It can be difficult to keep other threads from visiting a data structure while it is being modified, to guarantee data structure invariants across threads, etc. For example, consider a job scheduler that tracks the number of running jobs and finished jobs with counter variables. The sum of these counters should always equal the total number of jobs. The follow C code illustrates a typical computation:

void end_job( ) {--running; ++finished;}

If the function end_job( ) is run on one thread while another thread reads the variables 'running' and 'finished', it is possible for the second thread to read inconsistent data, for example, reading the new value of running but the old value of finished.

Transactional memory ("TM") may provide a better programming model for multithreaded shared memory applications. Transactional memory promises to provide code with isolation from other threads' accesses, serialization, as if only one transaction runs to completion at a time, and atomicity, so that either all of the data written within a transaction take effect, or none do.

An atomic block construct may be added to programming models or languages to provide TM semantics. This control structure delineates (defines the scope of) the statements in a transactional memory transaction. For example:

void atomic_end_job( ) {atomic {end_job( );}}

In this example, atomic_end_job( ) begins a transaction, calls end_job( ) which accesses the counter variables, and then tries to commit the transaction. The function end_job( ) is run within a transaction; the programmer depends upon the TM system to ensure the counter updates are isolated, atomic, and serialize with respect to any accesses from other threads.

The example also illustrates that code such as end_job( ) may be executed in absence of transactions or while within a transaction.

TM may be implemented in various ways. One approach, called bounded hardware TM ("HTM"), seeks to extend and repurpose the cache coherence machinery in a shared memory multiprocessor to provide two key mechanisms needed for correct implementation of TM semantics: conflict detection and version management.

Conflict detection discovers that data read in a transaction in one thread is concurrently written by another agent; or that data written in a transaction is concurrently read or written by another agent. Conflict detection makes transaction isolation and serializability possible. If throughout the lifetime of a transaction there are no data conflicts with any data read or written in the transaction, the transaction will serialize with respect to other agents' memory accesses and transactions.

Version management is used to buffer speculative writes to data in a transaction, until the transaction commits all such writes so they become permanent and globally observed by other agents. In the event of a data conflict, a transaction must abort, by rolling back any speculative writes it performed, and optionally starting over to reexecute the body of the atomic block.

The cache coherence system in a shared memory multiprocessor is a starting point in building a hardware transactional memory system. A plurality of processors with a plurality of caches, possibly private, must be coordinated so as to provide software with the illusion of a single, fast shared memory. Sometimes data is found in system memory, and sometimes the latest version is found in or more data cache lines. When an agent writes its cache's copy of the data, that data is the newest version of the data. If another agent attempts to read the same data, it sources it from the first agent's copy, rather than the stale copy in some other cache or in system memory. This is accomplished by means of a cache coherence protocol such as MESI. MESI (modified, exclusive, shared, invalid) is named for the cache line sharing state and state machine associated with each cache line in each coherent cache in the system. A cache coherence protocol may require agents to observe ("snoop") external reads and writes by the other agents in the system. As one agent reads data or writes data, a request is sent that is snooped by other agents' caches. This may cause a copy of the data cached in one cache to be invalidated, updated, or shared with other caches or with system memory.

These per-line coherence state machine transitions also correspond to the kinds of data conflicts that an HTM must detect. If a thread's cache line contains data read in a transaction, and then another agent writes it, the thread's cache's state may be changed. A similar process holds for a transactional write. Some embodiments provide indicators "read monitor" ("RM") and "write monitor" ("WM") and associated behaviors to each cache line entry, to identify which lines are transactionally read and/or written within a transaction, it is possible for cache hardware to detect conflicting accesses to the transaction's sets of read data and written data.

A cache also provides a basis upon which to implement data version management. If a cache is private to an agent, then during a transaction its cache lines may be repurposed to buffer speculatively written data from within the transaction. In some embodiments cache line entries may also comprise a "buffering indicator" ("BUF") to identify transactionally written lines. Buffered cache data lines are temporarily exempt from cache coherence processing. If another agent requests the latest version of a cache line, the cache does not forward its buffered line because the transaction has not committed and its writes must not be observed by other agents. HTM transaction commit clears buffering indicators across all cache lines—these lines are again globally observed. HTM transaction abort invalidates any cache lines marked with buffering indicators so any speculatively written data on those lines is discarded.

In some embodiments new instructions enable software to begin, commit, abort, suspend, and handle aborts for HTM transactions. A transaction begin (e.g. "TB") instruction puts the thread in "HTM mode" wherein all subsequent memory accesses are implicitly transactional, setting RM on memory loads and setting WM and BUF on memory stores; a transaction exit and commit (e.g. "TXCOM") instruction tries to commit the transaction, atomically clearing RM, WM, and BUF on cache lines; and so forth. For example, here is assembly code approximately corresponding to the atomic_end_job( ) function:

```
TB             ; begin transaction
DECR running   ; --running;'    implicitly transactional R+W
INCR finished  ; ++finished;    implicitly transactional R+W
TXCOM          ; try to exit and commit the transaction
```

This implementation of TM may be designated a cache resident, implicitly transactional TM ("CRITM").

When a transaction's set of memory accesses do not fit in the cache, the cache must necessarily evict a monitored or buffered cache line. In some embodiments this may cause the transaction to abort. Retrying the transaction may not help. In an n-way set associative cache based implementation, a transaction may abort after as few as n+1 memory accesses. Therefore an HTM in itself may not serve as the sole basis of a general purpose transactional memory system.

Nevertheless, some embodiments may elect to run small, simple transactions in an HTM mode and fall back to a more general mechanism when necessary.

Some embodiments may expose to software the RM, WM, and BUF properties that are logically associated with each cache line sized block of memory in the system, and physically associated with the set of cached lines in the cache at a given time. Making these properties visible to the instruction set architecture ("ISA") allows software to explicitly set these properties on an address to monitor it against conflicting accesses by other agents, to explicitly buffer selected data, to test these properties on an address, and to observe any loss of these properties. In some embodiments each thread has its own private copy of these properties.

TM may also be implemented entirely in software ("STM"). For a given memory load or store in the program in the scope of execution of a transaction, an STM system employs an STM read or write barrier that wraps the load or store with code to perform conflict detection and version management. In some embodiments an STM write barrier may attempt to lock the data against access by other threads and log its original value in case the write may need to be rolled back, and an STM read barrier may check whether the data is locked, and note the data's version or timestamp, in addition to performing a store or load respectively. STM barrier bookkeeping overheads can impact the performance of software executed in an STM implementation.

There is also the problem of code replication. Sometimes the STM system may need two executable copies of the code, one copy sans STM barriers when the code is executed outside a transaction and a second copy with STM barriers when executed inside a transaction. This overhead can also impact performance of an STM implementation.

In some embodiments transactional memory programming constructs such as atomic blocks fully compose with other constructs such as loops. It has been observed that if a data access occurs within a loop in a transaction, the data access's TM barrier may be performed for the same data over and over again at considerable overhead. In some embodiments it suffices to take a TM read or write barrier once per transaction per data item. Therefore a significant performance optimization is to apply a "barrier filter" to a TM barrier code sequence, which employs a filter indicator state per address per transaction, and first tests this indicator to determine whether the barrier has already been performed for this data address in this transaction; if so, the rest of the barrier is skipped; if not, the rest of the barrier is performed and the indicator is set to record the read or write barrier has been performed for this data item for this transaction.

It is expensive for a software implementation to maintain and consult this filter indicator for each data item accessed in a transaction. Therefore it may be beneficial to provide hardware assistance to associate per-transaction per-address state for each data item that may be accessed. In some embodiments the RM, WM, and BUF indicators described above, in addition to their roles in conflict detection monitoring and write buffering, may also be used as filter indicators, the processor instruction set including instructions to explicitly set, reset, and test the state of these respective indicators. For example in some embodiments the instructions to test RM, WM, and BUF properties for an address might be designated TESTRM, TESTWM, and TESTBUF. In some embodiments such test instructions might set a processor condition code or similar branch predication indicator if a property is set for the address. In some embodiments the processor condition code is already present in a legacy ISA from which an extended ISA is derived.

Therefore, a hardware accelerated STM ("HASTM") may be implemented such that on processors with this transactional memory hardware support, the RM, WM, and BUF indicators may be used by HASTM read and write barriers to perform redundant barrier filtering by testing the presence of a indicator for an accessed data item. If set, the barrier has already been performed for the item and the rest of the barrier code can be skipped; if not set, it may be the barrier has not yet been performed, or it may be the indicator was lost when the cache line holding the indicator was evicted or invalidated. If not set, the rest of the barrier including the STM conflict detection and version management bookkeeping are performed as before and the indicator is set for the data item.

To further increase the performance of the TM system, in some embodiments it may be possible to run each threads' transactions (if any) in transaction execution modes specific to the size, duration, and complexity of each respective transaction. If a transaction is small and simple, it may successfully execute and commit using CRITM execution mode. If a transaction is large, long running, or complex, it may require execution in an STM or HASTM execution mode. If a transaction is run on an older legacy processor that lacks TM hardware extensions, it may have to run in STM mode. Other threads sharing the same shared memory may be running code non-transactionally (in the 'non-transactional' TM mode). So multiple threads may simultaneously run various transactions in various transaction execution modes.

This approach may offer the best of both worlds: the efficiency of hardware TM execution when possible, and the generality of software TM otherwise. However a TM system must operate correctly even when there are potential or actual data access conflicts across threads running in different modes. So STM threads' conflict detection and version management data structures and algorithms can be made compatible with HTM threads' cache based approaches.

In some embodiments this may be accomplished by a "cache resident implicitly-transactional STM-compatible TM" ("CRISTM") TM execution mode. Like CRITM, CRISTM performs conflict detection and data versioning in hardware, implicitly as data items are accessed, and also CRISTM employs read and write barriers that first test the data's STM lock state if any to ensure it is not locked by another S™ thread. This implicitly sets a read monitor on the data's lock. In this way, CRISTM-mode threads respect STM locks, and subsequent STM data writes on other threads may be observed by CRISTM based threads.

In some embodiments such approaches allow multiple threads to concurrently execute multiple transactions using multiple transactional execution modes, correctly and efficiently. A transaction may start in a hardware accelerated mode like CRISTM and on abort, roll back the transaction and reexecute it using a software based TM implementation, and do so without disturbing execution of code, including TM code, that may be executing on other threads.

Mitigating Code Replication with Mode-Agnostic TM Memory Access Barriers

Now revisiting the issue of code replication overhead, some embodiments could require numerous different copies of executable subject code appropriate for running non-transactionally, under CRITM, CRISTM, HASTM, STM, or various other transactional execution modes optimized for particular execution conditions.

In some embodiments replication can be reduced or eliminated by employing mode-agnostic TM read and write barriers, such that a common barrier code sequence operates in any mode and/or on both legacy ISAs and novel hardware accelerated TM extended ISAs. A mode-agnostic read or write barrier may comprise: code to perform the read or write of the data item; code to test the barrier filter indicator; code to dispatch to a mode-specific barrier code sequence; and code to set the barrier filter indicator. In some embodiments a mode-specific barrier code sequence may comprise code to set the barrier filter indicator.

In some embodiments the code to dispatch to a mode-specific barrier code sequence can be performed through a variety of dispatch mechanisms such as table lookup, table index (vtable dispatch), by referring to dispatch information through a register or per-thread memory location, calling a helper function in a perform the dispatch, or a switch statement, or a branch decision tree, or various other means apparent to one skilled in the art.

In some embodiments the code to dispatch to a mode-specific barrier code sequence may be designed to anticipate that the compiled binary subject code may be coupled to a TM implementation software runtime that may be separately versioned and upgraded over the years, so that the compiled binary subject code including any inlined barrier dispatch code continues to work even as the TM runtime is versioned, and the set of TM implementation modes evolves, even to work correctly executing future TM modes and mode-specific barrier sequences that have not yet been contemplated.

In some embodiments a mode-agnostic TM barrier for a data access may be called as a subroutine from the subject code; in other embodiments a mode-agnostic TM barrier may be partially or wholly inlined into the subject code.

In some embodiments a mode-agnostic TM barrier employs a hardware based filter indicator as described above. In some embodiments a mode-agnostic TM barrier employs RM, WM, or BUF indicators as described above.

It may be desirable to have common software code binaries run correctly on both older legacy ISA processors as well as newer, upwards compatible extended ISA processors, for example with ISA extensions to accelerate execution of TM software. It is similarly desirable for a common mode-agnostic TM barrier code sequence to take advantage of hardware based filter indicators when available when running on TM enhanced ISAs and to also work correctly in absence of hardware filter indicators when the same code is run on older legacy ISA processors.

In some embodiments legacy ISA processors have instruction opcode patterns reserved for future use for ISA extension. In some embodiments reserved instruction opcode patterns are defined as valid executable NOPs ("no-operation"s) that may be safely executed to no effect on legacy ISA processors and may be repurposed and executed to a particular effect on future extended ISA processors.

In some embodiments instructions to test hardware filter indicators may be upwards compatibly added to an extended ISA by selecting instruction opcodes that were formerly reserved NOP opcodes in legacy ISA machines. In some embodiments a mode-agnostic TM read or write barrier may comprise code to test a barrier filter indicator which may comprise such upwards compatible hardware filter indicator test instructions. When run on legacy ISA processors, the test instruction executes as a NOP and the filter indicator test is always false. When run on extended ISA processors, the filter indicator test reflects the state of the indicator, which may be true when it was set by an earlier execution of the barrier for the given data item.

It may be desirable to execute a common mode-agnostic TM barrier even when executing subject code outside of a transaction. In some embodiments this may be accomplished by defining "non-transactional" execution as just another transaction execution mode in which no conflict detection or data version management occurs. In this case, a mode-agnostic TM barrier may dispatch to an empty mode-specific TM barrier that performs no TM management whatsoever and simply returns to the subject code.

It may be desirable to further reduce the code executed in mode-agnostic TM barrier processing when executing subject code outside of a transaction. In some embodiments the hardware filter indicator test instructions may be configured by software to return a true condition irrespective of the current state of the filter indicator for the given address. This enables software to force subsequent mode-agnostic TM barrier executions to filter out any mode-specific TM barrier dispatch and quickly exit from each mode-agnostic TM barrier. In some embodiments this configuration may be accomplished by setting a filter indicator mode control flag in a special register in the thread context. In some embodiments a filter indicator test instruction mode control flag may be configured to force subsequent filter indicator test instructions to return a true condition, or a false condition, or to reflect the actual state of the underlying filter indicator for the specified address.

To summarize, in some embodiments it is possible to use a set of common mode-agnostic TM barrier sequences that runs on legacy ISA and extended ISA processors, and that employs hardware filter indicators (when available) to filter redundant applications of TM barriers, and that enables a compiled binary representation of the subject code to run correctly in any of the currently implemented set of transactional memory execution modes, including running the code outside of a transaction, and that enables the same compiled binary to continue to work with future TM implementations which may introduce as yet unknown future TM execution modes.

Implicit and Explicit Hardware Transactional Memory Semantics

A cache based HTM as described above provides an efficient implementation of TM for transactions that fit in the limited capacity of the thread's private view of its cache.

It may be desirable to reduce the set of data accesses that receive hardware transactional memory semantics such as data conflict monitoring and speculative write buffering. In particular, when executing a transaction, some data accesses, such as to data shared with other threads, may require TM semantics, whereas other data accesses, such as to thread private variables on the stack, may not. If there were a way for software to differentiate the two cases to hardware, it may be possible to run a larger transaction in a given cache by selectively providing TM semantics to just the subset of the data accesses that require it.

In some embodiments such as the HTM described above, an instruction or other ISA mechanism is performed to establish an ambient HTM transaction execution mode on the thread such that data accesses are implicitly and automatically given TM semantics.

In some embodiments, an instruction or other ISA mechanism may be performed to selectively perform a data access within an HTM transaction execution mode that does not receive TM semantics.

In some embodiments, an instruction or other ISA mechanism may be performed to perform a data access that receives TM semantics even if the thread is not in an HTM execution mode.

In some embodiments, such as the Intel x86 and Intel64 architecture, most instructions may have memory operands that implicitly perform read and/or write memory accesses. In some embodiments a possibly optional instruction prefix may designate the memory accesses of the instruction to be explicitly transactional, explicitly not-transactional, or to explicitly receive the current thread ambient transactional semantics, or to explicitly receive the opposite of the current thread ambient transactional semantics, or otherwise modify the default transactional semantics the instruction would otherwise receive.

In some embodiments such as the Intel x86 and Intel64 architecture, memory operands on instructions refer to a default segment selector such as DS: or CS: or SS:, and instructions may also encode alternate selectors. In some embodiments of an HTM, the segment selector may be repurposed to also selectively control whether the data access specified by the instruction's memory operand should receive or not receive transactional semantics. In some embodiments, the specific transactional semantics associating behavior of each selector or sets of selectors this configuration may be accomplished by setting a selector transaction indication mode control field in a special register in the thread context. In some embodiments various settings of this mode control field may make some or all segment selectors designate explicitly transactional, explicitly non-transactional, thread-ambient, or explicitly contra-thread-ambient transactional semantics for their data accesses.

Detailed Examples of Some Embodiments that May be Implemented

Some embodiments herein address code duplication problems of hardware supported transactional memory systems. Novel implementation techniques, architectural interfaces and instruction encodings can allow a transactional memory system to create a single version of code that can execute (1) in multiple transactional execution modes, (2) outside of a transaction, or (3) on machines that don't have transactional memory hardware support. Code generated code sequences can use these architectural mechanisms.

Hardware transactional memory solutions may be implemented using cache memory. Referring now to FIG. 1A, an example environment is illustrated. FIG. 1A illustrates a plurality of processors 102-1-102-3. When referred to generically herein, the processors may be referred to simply as processor 102. In fact any component referred to using a specific appendix designator may be referred to generically without the appendix designator, but with a general designator to which all specific examples belong. Each of the processors implements one or more threads (referred to generically as 104). In the present example, each of the processors 102-1-102-3 supports a single thread 104-1-104-3 respectively. However, embodiments may be implemented where processors support multiple threads. Each of the threads 104-1-104-3 includes an instruction pointer 106-1-106-3, general registers 108-1-108-3, and special registers 110-1-110-3. Each of the special registers 110-1-110-3 includes a transaction control register (TCR) 112-1-112-3 and a transaction status register (TSR) 114-1-114-3. The functionality of these registers will be explained in more detail below in conjunction with the description of FIG. 1B.

Figure 1B:
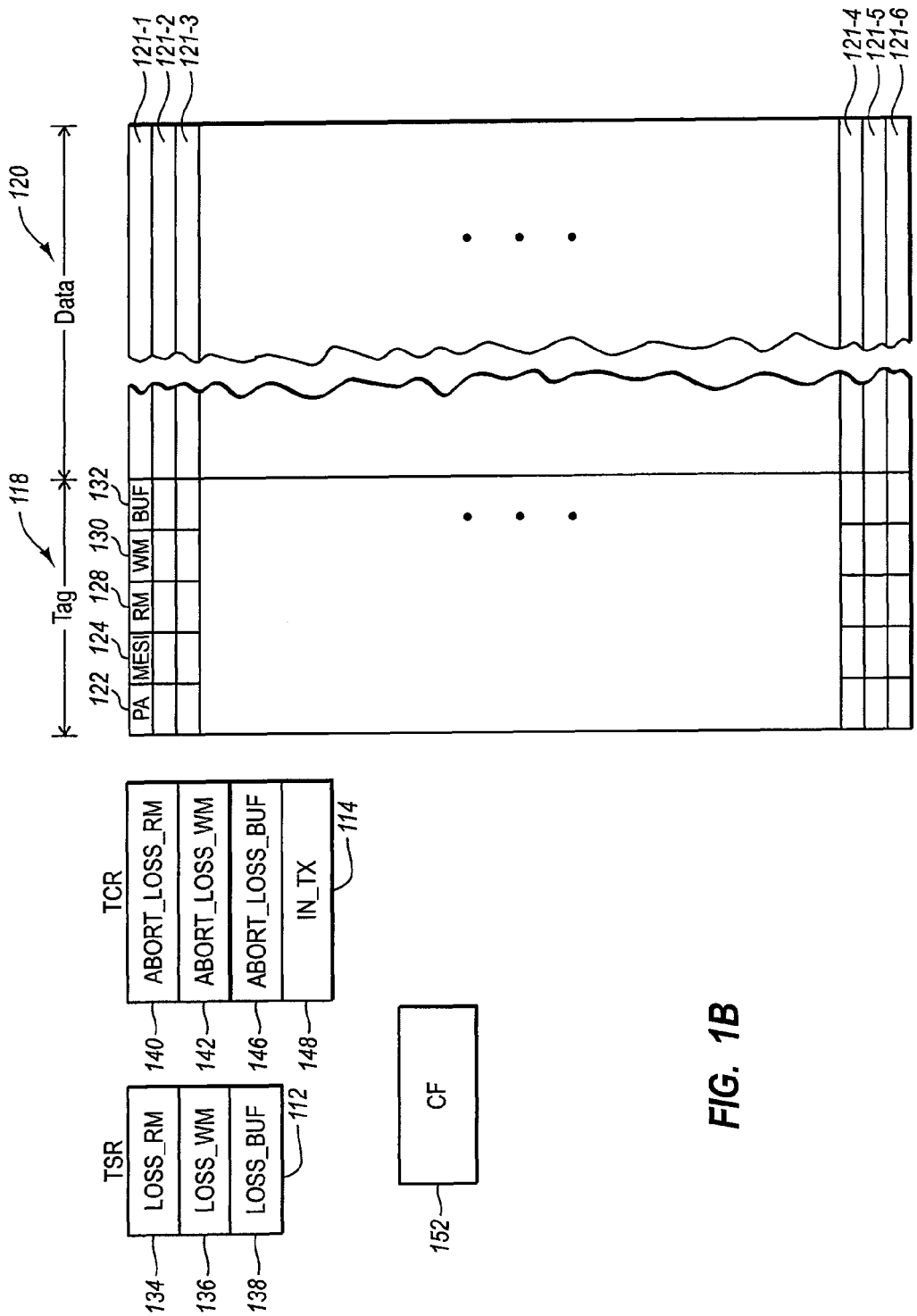
FIG. 1B illustrates details of a data cache with monitoring enabled.

Reference once again to FIG. 1A further illustrates that connected to each processor is a level 1 data cache (L1D$) 116-1, 116-2 and 116-3. Details of a L1D$ are now illustrated with reference to FIG. 1B. FIG. 1B illustrates that a L1D$ 116 includes a tag column 118 and a data column 120. The tag column 118 typically includes an address column 122 and a MESI column 124. The MESI indicator is used for implementing the Illinois MESI protocol and indicates a state of data in a cache line. MESI stands for the modified (or dirty), exclusive, shared and invalid states respectively. Because in a cache hierarchy there may be several different copies of a particular piece of data, an indicator is used to indicate the state and sharing of data at a particular location. If the indicator indicates that the data is modified, that means that the data at that location was modified by an agent at that location and no other agents have a cached copy of the data. If the indicator indicates that data is exclusive, this means that no other agents have a cached copy of the data. If the indicator indicates that the data is shared, this means that other agents may share the same version of the data. If the data is indicated as invalid, then the data at the current location is invalid and will not be used.

In a cache-coherent multiprocessor, a level of data cache that is logically private to one processor (usually level one data cache (L1D$)) may be extended with additional MESI states and behavior to provide cache coherence based detection of conflicting data accesses from other agents, and to locally buffer speculative writes in a private cache such that other agents in the system do not observe speculatively written data until the data's state transitions from speculatively written to globally observed.

The address column 122 includes a physical address for data stored in the data column 120. In particular, as illustrated in FIG. 1A, a computing system generally includes system memory 126. The system memory may be, for example semiconductor based memory, one or more hard-drives and/or flash drives. The system memory 126 has virtual and physical addresses where data is stored. In particular, a physical address identifies some memory location in physical memory, such as system DRAM, whereas a virtual address identifies an absolute address for data. Data may be stored on a hard disk at a virtual address, but will be assigned a physical address when moved into system DRAM.

In the present example, the tag column 118 includes three additional columns, namely a read monitor column (RM) 128, a write monitor column (WM) 130 and a buffer indicator column (BUF) 132. Entries in these columns are typically binary indicators. In particular, a RM entry in the RM column 128 is set on a cache line basis for a particular thread, and indicates whether or not a block of data in the data column 120 should be monitored to determine if the data in the data column 120 is written to by another thread. A WM entry in the WM column 120 is set on a cache line basis for a particular thread, and indicates whether or not the block of data in the data column 120 should be monitored to determine if the data in the data column is read by or written to by another thread. A BUF entry in the BUF column is set on a cache line basis for a particular thread 132, and indicates whether or not data in an entry of the data column 120 is buffered data or if the data is cached data. In particular, the BUF entry can indicate whether a block of data is taken out of cache coherence or not.

Notably, while the RM column 128, the WM column 130, and BUF column 132 are treated as separate columns, it should be appreciated that these indicators could be in fact combined into a single indicator. For example, rather than using one bit for each of the columns, two bits could be used to represent certain combinations of these indicators collectively. In another example, RM column 128, the WM column 130, and BUF column 132 may be represented together with the MESI indicators in the MESI column 124. These seven binary indicators (i.e. M, E, S, I, RM, WM, and BUF) could be represented with fewer bits.

Notably, the indicators in the RM column 128, the WM column 130, and BUF column 132 may be accessible to a programmer using various programming instructions made accessible in a processor's instruction set architecture.

FIG. 1B further illustrates details of the transaction status register 112 included in the hardware threads 104. The transaction status register 112 accumulates events related to the read monitor indicator, the write-monitor indicator, and the buffer monitor indicator. In particular, the transaction status register 112 includes an entry 134 to accumulate a loss of read monitor, an entry 136 to accumulate a loss of write monitor, and an entry 138 to accumulate a loss of buffering.

Illustrating now an example, a software designer may code instructions that when executed by the thread 104-1 cause a read monitor indicator to be set for a memory block. If another thread writes to an address in the monitored memory block, such a conflicting access causes the read monitor indicator to be reset, and accumulates in the loss of read monitor entry 134. A similar case applies when a write monitor indicator is set, and another thread reads or writes to an address in the monitored memory block, causing the write monitor to be reset, and accumulates in the loss of write monitor entry 136.

FIG. 1B illustrates further details of the transaction control register 114. The transaction control register 114 includes entries defining actions that should occur on the loss of read monitor, write-monitor, and/or buffering. In particular, the transaction control register 114 includes an entry 140 that indicates whether or not a transaction should be aborted on the loss of the read monitor, an entry 142 that indicates whether or not a transaction should be aborted on the loss of the write monitor, and an entry 146 that indicates if the transaction should be aborted on the loss of buffering. Abort is implemented by a hardware control transfer (jump) to a software abort handler.

For example, and continuing with the example above where a software designer has coded instructions that when executed by the thread 104-1 cause a read monitor indicator to be set for a memory block, if another thread writes to an address in the memory block, in addition to noting such access in the read monitor entry 134, the read monitor indicator in the read monitor column 128 may be reset.

Novel mode-specific behaviors for transactional memory instructions that allow a transactional memory instruction to be used in different contexts may be implemented. One architectural mechanism encodes transactional memory-related instruction such that they execute as NOPs on machines that do not have transactional memory hardware support. A NOP is a processor instruction that does not perform any function on earlier generations of a processor for which it is implemented, but rather is reserved for later generations of processors to implement additional functionality as the need arises. This encoding allows the compiler to generate a single version of code that executes either in a hardware-accelerated mode on machines with transactional memory support or in pure-software transactional memory mode on machines that may not have hardware transactional memory support.

Another mechanism introduces transactional memory instructions that execute as transactional memory access instructions when executed within the context of a transaction and as regular memory accesses otherwise. This allows the transactional memory system to generate code that not only executes only shared memory accesses in a transactional fashion but also executes these accesses as regular accesses outside of a transaction.

Another mechanisms uses segment overrides that control whether an access executes as a transactional access inside or outside of a transaction. This again allows the transactional memory system to generate code that executes shared memory accesses in a transactional fashion and at the same time executes as regular non-transactional accesses when executed on machines with no transactional memory hardware support or when executed outside of a transaction.

One embodiment includes specially encoded instructions. One such instruction is a specially encoded test-read-monitor instruction. In the examples illustrated herein, "testrm" is used to illustrate the test-read monitor instruction. The testrm instruction tests whether a specified block of memory has read-monitoring set. For example, the testrm instruction can test an RM entry 128 for a cache line 121 for a particular address 122 to determine if read monitoring is set for the cache line 121. Another such instruction is a specially encoded test-buffering instruction. In the examples illustrated herein, "testbf" is used to illustrate the test-buffering instruction. The testbf instruction tests whether a specified block of memory is buffered in hardware. For example, a testbf instruction can test a BUF entry 132 for a cache line 121 for a particular address 122 to determine if buffering is set for the cache line 121. Cache memory can also be used to buffer data such that the buffered data can be used to roll back values if a transaction is aborted.

In one embodiment, the testrm and testbf encodings use existing NOP instruction encodings so that they execute as NOPs on existing machines. New machines with transactional memory hardware support execute testrm and testbf as NOPs outside of the dynamic scope of a transaction or as a regular test-read-monitor and test-buffering instruction inside a transaction. The following illustrates details of one example of how this is accomplished.

A thread 104 may include a number of special status registers. One of the registers in the special status registers is a transaction control register 114. A transaction control register 114 includes an in transaction indicator which indicates whether a hardware based transactional memory is active or not. In the following examples, this indicator is represented by TCR.IN_TX 148 and when asserted, this indicates that hardware is in a transaction. In one embodiment, the behavior of the testrm and testbf instructions depends on the state of the IN_TX register 148. Another status register in the special registers 110 is the carry flag 152. The carry flag 152 is used extensively to take or not take conditional jumps. Thus, the carry flag 152 can be used to indicate that both hardware transactional memory is enabled and the per address indicator being tested is set. A conditional jump can then be made by referencing the carry flag 152 to determine whether the rest of the transactional memory barrier should be performed or bypassed (because it is redundant or disabled). Note that while the carry flag is used in the examples herein, other indicators may alternatively or additionally be used. The following pseudo-code describes the behavior of one example of the testrm and testbf instructions.

TESTRM

```
if (TCR.IN_TX == 1)
{
    if (for all mblk in [addr..addr+OperandSize−1]), mblk.RM = 1)
    {
        CF := 1;
    }
    else
    {
        CF := 0;
    }
}
```

In effect, the carry flag CF is cleared unless both hardware transactional memory is enabled and the read monitor for the address is set.

TESTBF

```
if (TCR.IN_TX == 1)
{
    if (for all bblk in [addr..addr + OperandSize−1]), bblk.BF = 1)
    {
```

TESTBF -continued

```
        CF := 1;
    }
    else
    {
        CF := 0;
    }
}
```

In effect, the carry flag CF is cleared unless both hardware transactional memory is enabled and the buffering indicator for the address is set.

The following pseudo-code examples present "blended code generation" templates for generating read barrier code in a native code transactional memory system. Similar processor specific instructions could be applied in other embodiments. The code works on legacy hardware with no support for transactional memory by executing an instruction, such as the testrm instruction as a NOP on this legacy hardware. In the embodiment illustrated, the sequence factors the first few instructions common to the barriers and optimizes code layout so that the expected slow path mode specific transactional memory barrier sequence is placed out of line. In the embodiment illustrated, the slow path uses a table of pointers to read barrier functions. The clear carry flag instruction (clc) clears the carry flag so that out-of-line mode specific transactional memory barrier sequence is executed when running on hardware with no transactional memory support or when not running with hardware acceleration.

The following illustrates an example of mode agnostic transactional memory read barrier for loading a value pointed to by a pointer "p" into an integer variable "t". In other words, the operation t=*p is performed.

| | |
|---|---|
| mov t, [p] | // copies an integer value pointed at by a pointer by into a variable t. |
| clc | // clears the carry flag. |
| testrm [p] | // on processors with transactional hardware support, tests for read monitoring for the integer at pointed to by "p". Note that this instruction will set the carry flag (as shown in the pseudo code for testrm above) if both the hardware transactional memory indicator is set and the RM property is set for address p as a "filter indicator". On processors without transactional hardware support, this instruction is a NOP and thus has no effect. |
| jnc out_of_line_slow_path | // jumps to out_of_line_slow_path if the carry flag is not set. This occurs when there is no transaction hardware support or when the filter indicator was not set. |
| done: | // returns processing |
| ... | |
| Out_of_line_slow_path: | |
| t = mode->tmRdI4(p); | // performs slow path transactional operations |
| jmp done // | // jumps to done. |

Similar to the read barrier blended code sequence, the following pseudo-code shows a blended code generation template for generating write barrier code in a native code system. In this example, an integer "t" is moved into the integer pointed to by pointer "p", or in other words, *p=t; is performed.

```
clc                         // Clears the carry flag.
testbf [p]                  // on processors with transactional hardware support, tests
                               for buffering for the integer at pointed to by "p".
                               Note that this instruction will set the carry flag (as
                               shown in the pseudo code for testbf above) if the
                               hardware transactional memory indicator is set and the
                               BUF property is set for address p as a "filter
                               indicator". On processors without transactional
                               hardware support, this instruction is a NOP and thus
                               has no effect.
jnc out_of_line_slow_path   This occurs when there is no transaction hardware
                               support or when the filter indicator was not set
movxb [p],t                 // Performs an explicitly buffered move of the variable
                               "t" into memory at the address pointed to by pointer
                               "p". This both stores the integer and establishes the
                               buffering property on the integer data which also
                               serves as the filtering indicator for the address.
done:
...
Out_of_line_slow_path:
t = mode-                   // performs slow path transactional operations
>tmWrI4(txnDesc,p,t);
jmp done                    // Jumps to done
```

In another variant, the hardware can execute in a mode where the testrm and testbf instructions always set the carry flag, even when executing outside of a transaction. In this variant, the above barriers could be used both inside and outside of transactions on processors that support the new transactional memory instructions.

Another embodiment applies mode-specific behavior to instructions that perform transactional load or store operations. In one variant, the architecture defines a move, with explicit monitoring, instruction (illustrated herein by an instruction "movxm") that when executed inside a transaction (indicated in examples herein by the TCR.IN_TX bit being set in a control register) loads data and at the same time starts monitoring the location for conflicting accesses by other agents. When executed outside the context of a transaction (indicated in examples herein by the TCR.IN_TX being deasserted), the movxm instructions executes as a regular load. Similarly, the architecture may define a move with explicit buffering (illustrated herein by an instruction "moxvb") instruction that when executed outside of a transaction, executes as a regular store, and when executed inside a transaction, stores to a location but buffers the stored value in a hardware structure, such as the L1D$ 104 (or some other portion of cache or memory) so that it's not globally visible.

When generating code that might execute inside the scope of a transaction, the transactional memory system may use instructions such as movxm or movxb for load or store instructions respectively that might access mutable shared locations. For accesses to thread-private locations (e.g., slots in the stack frame) or immutable locations (e.g., floating-point constants loaded from memory or slots in a dispatch table), the transactional memory system may use regular load or store instructions. Code generated in this way can execute both outside of a transaction and inside of a transaction in which the hardware detects all conflicts and manages versioning. Compared to code in which the hardware implicitly treats all accesses as transactional, code that uses movxb and movxm can use the limited transactional memory hardware in a smarter way by treating only accesses to shared mutable state as transactional. This optimization extends the footprint of bounded hardware transactional memory systems.

Another variant takes the complimentary approach: All accesses are implicitly transactional except those that are explicitly non-transactional. For example, an instruction, illustrated herein by a movxu instruction, performs an explicitly unbuffered and unmonitored access regardless of whether inside or outside of a transaction.

In another variant, while in a transaction (in some examples illustrated herein when TCR.IN_TX=1), the monitoring and buffering behavior of a memory access is defined by a combination of the segment register used in an address and the value of a control register bit (illustrated in the following examples as a TCR.MONITOR_BUFFER field). In the processor 102, there are a number of sixteen-bit segment registers, CS, DS, SS, ES, FS, and GS (code segment, data segment, stack segment, extra segment, extra segment, and extra segment respectively). However, these register are rarely used for their originally designed purpose and are often available for other uses. The following illustrates the use of the segment registers and the special control register field to color any instruction that does a memory access to flexibly select whether a memory access receives transactional memory monitoring and buffering, or not.

When a control register field TCR.MONITOR_BUFFER is set to MB_DATA, all accesses to any segment except the stack (SS) segment set the read monitor for any data read and set the write monitor and buffered properties for any data written.

When TCR.MONITOR_BUFFER is set to MB_ALL, all accesses to any segment set the read monitor for any data read and set the write monitor and buffered properties for any data written.

When TCR.MONITOR_BUFFER is set to MB_SS, only accesses to the stack (SS) segment set the read monitor for any data read and set both the write monitor and buffered properties for any data written.

The following table illustrates the change in the monitoring behavior of loads:

|  | TCR.IN_TX | | | | |
| --- | --- | --- | --- | --- | --- |
|  | 0 | 1 | 1 | 1 | 1 |
| TCR.MONITOR_BUFFER | Any | MB_NONE | MB_SS | MB_DATA | MB_ALL |
| CS, DS, ES, FS, GS | Unmonitored | Unmonitored | Unmonitored | Monitored | Monitored |
| SS | Unmonitored | Unmonitored | Monitored | Unmonitored | Monitored |
| MOVXM | Unmonitored | Monitored | Monitored | Monitored | Monitored |

The following table illustrates monitoring and buffering for stores

|  | TCR.IN_TX | | | | |
| --- | --- | --- | --- | --- | --- |
|  | 0 | 1 | 1 | 1 | 1 |
| TCR.MONITOR_BUFFER | Any | MB_NONE | MB_SS | MB_DATA | MB_ALL |
| CS, DS, ES, FS, GS | Unmonitored | Unmonitored | Unmonitored | Buffered + Monitored | Buffered + Monitored |
| SS | Unmonitored | Unmonitored | Buffered + Monitored | Unmonitored | Buffered + Monitored |
| MOVXB | Unmonitored | Buffered | Buffered | Buffered | Buffered |

Using this mechanism, the transactional memory system can generate code that can execute both inside and outside a hardware transaction, and can also execute outside of a transaction on hardware with no transactional memory support and can flexibly control whether any given memory access is monitored or buffered in order to optimize the transactional memory cache footprint.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

One method includes acts for executing transactional memory atomic blocks in any of one or more of a plurality of transactional execution modes, including processor transactional execution modes or in modes not supporting hardware based transactional execution. Transacted data accesses, including loads or stores, are translated into, and executed using mode agnostic transactional read barriers for loads and mode agnostic transactional write barriers for stores. In particular, the same code can be compiled and used for processors that support hardware transactions or used for processor that do not support hardware transactions, but rather rely on software based transactional memory. The method includes utilizing a mode agnostic transactional read barrier. The mode agnostic transactional read barrier includes one or more code sequences including a plurality of mode specific transactional read barrier code sequences for different transactional execution modes. The mode agnostic transactional read barrier includes the same code sequences irrespective of the current transactional execution mode. Examples of this are illustrated above in the discussion of the mode agnostic blended-code generation templates.

Utilizing the mode agnostic transaction read barrier includes executing one or more instructions to load data (e.g. mov t, [p] in the example above) and executing one or more code sequences to dispatch to and perform one or more mode specific transactional read barriers, appropriate for a transactional execution mode, on the data (e.g. t=mode−>tmRdI4(p) in the example above).

Further, the method includes utilizing a mode agnostic transactional write barrier. The mode agnostic transactional write barrier includes a plurality of mode specific transactional write barrier code sequences for different transactional execution modes. The mode agnostic transactional write barrier includes the same code sequences irrespective of the current transactional execution mode. Utilizing the mode agnostic transaction write barrier includes executing one or more instructions to store data and executing one or more code sequences to dispatch to and perform one or more mode specific transactional write barriers, appropriate for a transactional execution mode, on the data (such as either an explicitly buffered move, movxb, or a dispatch to a mode specific transactional memory write barrier code sequence t=mode−>tmWrI4(txnDesc,p,t) illustrated above).

The method may be performed where executing one or more code sequences to implement one or more mode specific transactional read barriers, appropriate for a transactional execution mode, on the data includes selecting a code sequence to execute to dispatch to and perform a mode specific transactional read barrier based on the transactional execution mode by looking up a mode specific read barrier code address from a register and executing a mode specific barrier at that address.

Executing one or more code sequences to implement one or more mode specific transactional write barriers, appropriate for a transactional execution mode, on the data includes dispatching to and performing a mode specific transactional write barrier based on the transactional execution mode by looking up a mode specific write barrier code address from a register and executing a mode specific barrier at that address.

The method may be performed where executing one or more code sequences to implement one or more mode specific transactional read barriers, appropriate for a transactional execution mode, on the data includes dispatching to and performing a mode specific transactional read barrier based on the transactional execution mode by looking up a mode specific read barrier code address from memory and executing a mode specific barrier at that address.

The method may be performed where utilizing a mode agnostic transactional read barrier includes executing code to test whether to, and to bypass one or more mode specific transactional read barriers when the one or more mode specific transactional read barriers are redundant or disabled. The method may be performed where utilizing a mode agnostic transactional write barrier includes executing code to test whether to, and to bypass one or more mode specific transactional write barriers when the one or more mode specific transactional write barriers are redundant or disabled. Examples are illustrated above.

In some embodiments, a per-transaction per-address indicator is set as a result of executing one or more code sequences to implement one or more mode specific transactional read barriers, appropriate for a transactional execution mode and wherein testing whether to bypass one or more mode specific transactional read barriers includes reloading and testing the per-transaction per-address indicator.

In some embodiments, setting and testing a per-transaction per-address indicator includes setting and testing read monitor or write monitor state for a corresponding blocks of memory. In some embodiments, software tests the indicator via new instructions to test the presence of read monitor or write monitor state.

Testing may be performed using NOPs in prior generations of hardware so as to enable mode agnostic behavior on the prior generations of hardware.

The new instruction may enable mode agnostic read or write transactional memory access barriers to execute correctly whether the compiled code is executed in a hardware transaction execution mode, on hardware not supporting hardware transactions or executed outside of a transaction by the new instruction setting a hardware transaction execution state indicator at transaction initiation on hardware supporting hardware transactions, wherein the hardware transaction execution state indicator is a flag existing on generations of hardware supporting hardware transactions and on generations of hardware not supporting hardware transactions, and wherein the transaction test instructions have no effect when this indicator is not set. For example, the hardware transaction execution state indicator may include a carry flag in a processor's special registers.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing apparatus comprising:
one or more processors
one or more memories coupled to the one or more processors;
an instruction set architecture interface coupled to the one or more processors that includes mechanisms to implement instructions, wherein the instruction set architecture interface comprises:
a mechanism including one or more processor level instructions that when executed by a processor with transactional memory hardware support performs a test to determine if the processor is in a transactional mode and tests a per-transaction per address hardware maintained indicator indicating if monitoring or buffering is set for the address and sets a flag when both the processor is in a transactional mode and when monitoring or buffering is set for the address, where the flag is later used to determine whether or not to bypass one or more mode specific transactional write barriers or one or more mode specific transaction read barriers when the one or more mode specific transactional write barriers or the one or more mode specific transactional read barriers are redundant or disabled, but when executed on a processor without transactional support, the one or more processor level instructions execute as one or more NOPs.

2. The computing apparatus of claim 1, an instruction set architecture interface further comprising a mechanism including one or more processor level instructions that allow memory operations to explicitly establish transactional read monitoring, write monitoring or buffering when executed by a processor with transactional hardware support.

3. The computing apparatus of claim 1, an instruction set architecture interface further comprising a mechanism including one or more processor level instructions that allow memory operations to explicitly not modify transactional read monitoring, write monitoring or buffering when executed by a processor with transactional hardware support.

4. A method of executing transactional memory atomic blocks in any of one or more of a plurality of transactional execution modes, including hardware transactional execution modes, or in modes not supporting hardware based transactional execution, or even when not in a transaction, wherein transacted data accesses, including loads or stores, are translated into, and executed using mode agnostic transactional read barriers for loads and mode agnostic transactional write barriers for stores, the method comprising:
utilizing a mode agnostic transactional read barrier, the mode agnostic transactional read barrier including one or more code sequences including optionally dispatching to a plurality of mode specific transactional read barrier code sequences for different transactional execution modes, the mode agnostic transactional read barrier comprising common code sequences irrespective of the current transactional execution mode, wherein utilizing the mode agnostic transactional read barrier comprises:
executing one or more instructions to load data;
executing one or more code sequences to implement one or more mode specific transactional read barriers, appropriate for a transactional execution mode, on the data causing a per-transaction per-address indicator to be set; and
executing code to test whether to bypass one or more mode specific transactional read barriers when the one or more mode specific transactional read barriers are redundant or disabled, and executing code to perform the bypass; and
utilizing a mode agnostic transactional write barrier, the mode agnostic transactional write barrier including optionally dispatching to a plurality of mode specific transactional write barrier code sequences for different transactional execution modes, the mode agnostic transactional write barrier comprising common code sequences irrespective of the current transactional execution mode, wherein utilizing the mode agnostic transactional write barrier comprises:
executing one or more instructions to store data;
executing one or more code sequences to implement one or more mode specific transactional write barriers, appropriate for a transactional execution mode, on the data and
utilizing a mode agnostic transactional write barrier comprises executing code to test whether to bypass one or more mode specific transactional write barriers when the one or more mode specific transactional write barriers are disabled, and executing code to perform the bypass, wherein testing whether to bypass one or more mode specific transactional write barriers comprises loading and testing the per-transaction per-address indicator.

5. The method of claim 4, wherein:
executing one or more code sequences to implement one or more mode specific transactional read barriers, appropriate for a transactional execution mode, on the data comprises selecting a code sequence to execute to implement a mode specific transactional read barrier based on the transactional execution mode by looking up a mode specific read barrier code address from a register and executing a mode specific barrier at that address; and
executing one or more code sequences to implement one or more mode specific transactional write barriers, appropriate for a transactional execution mode, on the data comprises selecting a code sequence to execute to implement a mode specific transactional write barrier based on the transactional execution mode by looking up a mode specific write barrier code address from a register and executing a mode specific barrier at that address.

6. The method of claim 4, wherein:
executing one or more code sequences to implement one or more mode specific transactional read barriers, appropriate for a transactional execution mode, on the data comprises selecting a code sequence to execute to implement a mode specific transactional read barrier based on the transactional execution mode by looking up a mode specific read barrier code address from memory and executing a mode specific barrier at that address; and
executing one or more code sequences to implement one or more mode specific transactional write barriers, appropriate for a transactional execution mode, on the data comprises selecting a code sequence to execute to implement a mode specific transactional write barrier based on the transactional execution mode by looking up a mode specific write barrier code address from memory and executing a mode specific barrier at that address.

7. The method of claim 4, wherein the indicator comprises a read monitor or write monitor or buffering state for corresponding blocks of memory.

8. The method of claim 4, wherein software tests the indicator via one or more instructions added to a baseline instruction set architecture to create a transactional extended instruction set architecture.

9. The method of claim 8, wherein instruction encoding of the one or more instructions that test the per-transaction per-address indicator testing is performed using NOPs in baseline instruction set architectures so as to enable a common mode agnostic barrier executable code sequence to execute correctly on both baseline instruction set architectures and on transactional hardware extended instruction set architectures.

10. The method of claim 8 wherein the one or more instructions enable mode agnostic read or write transactional memory access barriers to execute correctly whether the compiled code is executed in a hardware transaction execution mode, on hardware not supporting hardware transactions or executed outside of a transaction by the one or more instructions setting a filtering indicator when the test on hardware supporting hardware transactions when a per transaction per-address indicator is set, wherein the hardware transaction execution state indicator is a baseline instruction set architecture condition flag common to both generations of hardware supporting hardware transactions and to generations of hardware not supporting hardware transactions, and wherein the indicator test instruction has no effect when this indicator is not set.

11. The method of claim 10, wherein the test output indicator comprises a carry condition code flag in a processor's special registers.

12. A method of executing transactional memory atomic blocks in any of one or more of a plurality of transactional execution modes, including processor transactional execution modes or in modes not supporting hardware based transactional execution, wherein transacted data accesses, including loads or stores, are translated into, and executed using mode agnostic transactional read barriers for loads and mode agnostic transactional write barriers for stores, the method comprising:
- an agent executing one or more instructions to load or store data;
- clearing a hardware flag used to determine if a mode specific barrier can be skipped;
- after executing one or more instructions to load or store data and clearing the flag, executing a monitor or buffer test instruction for the address for the data, which on supported agents, including some agents with transactional hardware support, tests for read monitoring or buffering state on a cache line that contains the data and sets the flag if the monitoring or buffering state is asserted, and on agents without transactional hardware support, executes as a NOP and thus has no effects on the flag; and
- then determining if the flag is set, and if the flag is not set, then dispatching to a transactional execution mode specific read or write barrier.

13. The method of claim 12, wherein the agent is a processor.

14. The method of claim 12, wherein the agent is a thread.

15. The method of claim 12, wherein the transactional execution mode specific read or write barrier executes processor level instructions to set monitoring or buffering indicators.

* * * * *